United States Patent Office 3,396,660
Patented Aug. 13, 1968

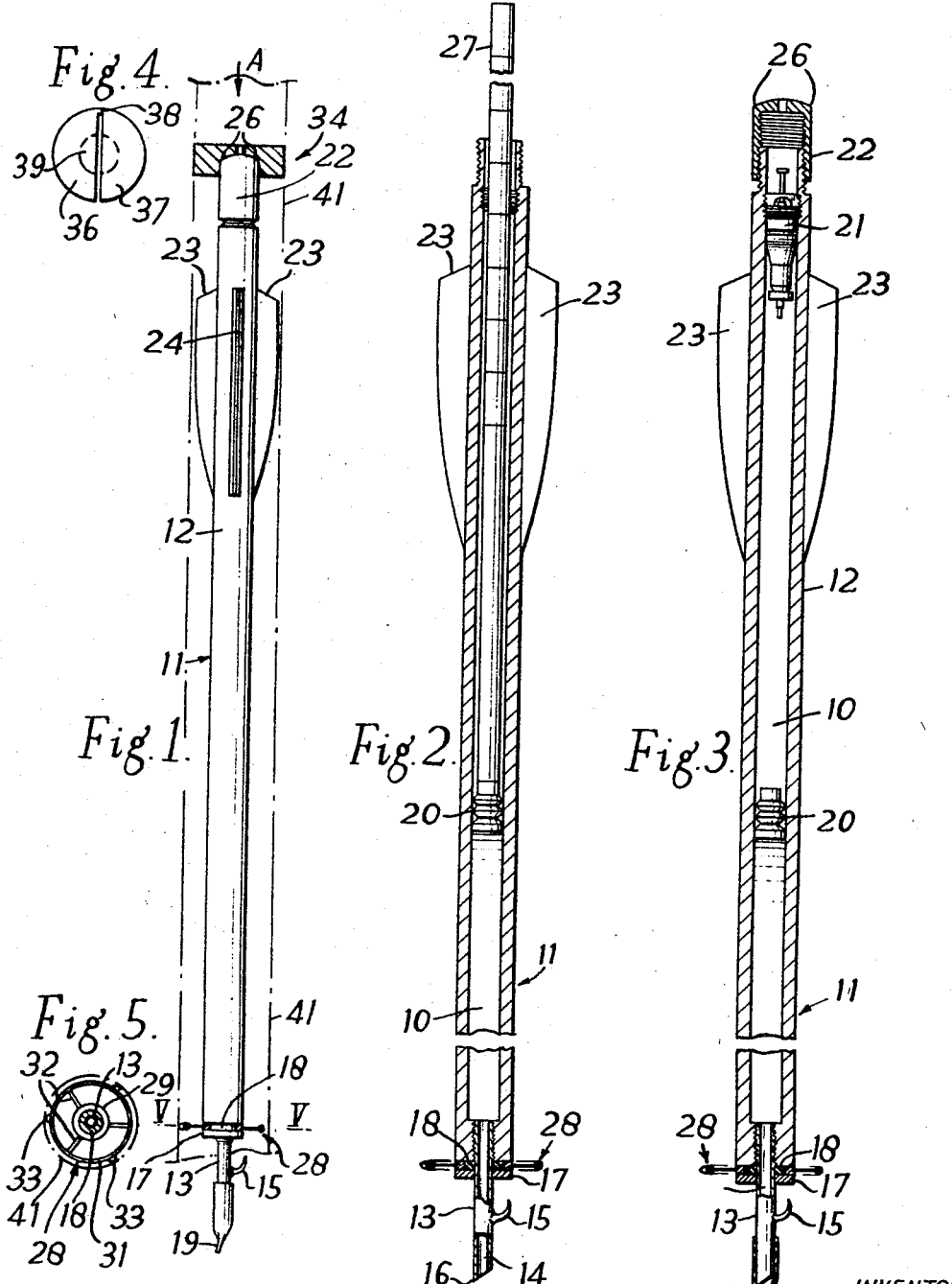

3,396,660
HYPODERMIC DARTS
Frank L. Bilson, West Wickham, and Ronald F. Isted, Charlwood, England, assignors to Jack The Yeoman Sales Limited, London, England
Filed Mar. 16, 1966, Ser. No. 534,727
Claims priority, application Great Britain, Mar. 19, 1965, 11,847/65; Aug. 2, 1965, 33,007/65
5 Claims. (Cl. 102—92)

ABSTRACT OF THE DISCLOSURE

A hypodermic dart, to be fired at wild animals or birds by a gun, a longbow or a crossbow, comprises a hollow shaft, which contains a drug to be administered to an animal or bird. The shaft has a point portion at one end with a passage for the drug extending through it but closed by a pierceable cap over its front end. A piston is provided in the bore of the shaft to expel the drug and is arranged to be driven down the bore by air pressure. A reverse check valve is mounted at the rear end of the shaft together with means for connecting the shaft to a source of air pressure. In use, the dart is charged with a drug and the bore is pressurised, but the piston does not expel the drug until the front end of the point portion strikes an animal and pierces the cap covering it.

---

This invention relates to hypodermic darts used for administering fluid drugs and the like to animals or birds.

It is an object of the invention to provide a hypodermic dart which enables a predetermined quantity of a fluid drug or the like to be administered to an animal in an easy and convenient manner.

With this object in view, there is provided according to the present invention a hypodermic dart including a shaft having a bore extending longitudinally through it, the shaft being provided at one end with a sharpened point portion having a passage running through it, which communicates with the bore, and arranged to have a closure member fitted on it in use, a piston being arranged for sliding movement along the bore while sealing against its wall or walls and the shaft being arranged to have a valve through which air can be pumped to pressurise the bore removably fitted at or near its other end.

Such a dart can be charged with a predetermined quantity of a drug and its bore can then be pressurised, with the result that, when the dart is projected at an animal or bird and its point portion pierces the closure member and the skin of the animal or bird, the drug is forced into the bloodstream of the animal or bird.

To enable the dart to be discharged from a gun having a bore, it may be provided with a locating member adapted to engage the wall of the bore, in use, and thus to maintain the dart parallel, or coaxial, with the bore during its passage along the bore.

The word "gun" is used in the preceding paragraph and throughout this specification in a broad sense, that is to say to include any device for discharging a missile from a barrel, such as a rifle, shotgun, or other explosive-powered gun, compressed air gun, carbon dioxide or other gas-powered gun, or any similar means for propelling bullets, shot, or other missiles.

The invention will now be described by way of example with reference to the accompanying drawings, in which:

FIGURE 1 is a side elevational view of a hypodermic dart, in a gun barrel,

FIGURE 2 is a cross-sectional, side elevational view, on an enlarged scale, of the dart shown in FIGURE 1 during the process of being charged, FIGURE 3 is a similar view to FIGURE 2 of the dart when charged, FIGURE 4 is a view on arrow A in FIGURE 1, and FIGURE 5 is a line section on the line V—V in FIGURE 1.

Referring to the drawings, a dart 11 has a cylindrical shaft 12, which has a bore 10 extending longitudinally through it and is provided at one end with a point portion 13. The point portion 13 consists of a cylindrical metal member having a passage 14 running through it and having one end 16 cut at an angle, as shown. The point portion 13 is fitted with a small barb 15. The edge of the end 16 of the metal member is sharpened. The point portion 13 is secured to the shaft 12 by screw threads, and, when so secured, its passage 14 is in communication with the bore 10. A metal washer 17 is fixed around the point portion 13 and a rubber washer 18 is positioned between the washer 17 and the end of the shaft 12. A locating member 28 is positioned around the rubber washer 18 between the washer 17 and the end of the shaft 12. The locating member 28, as seen best in FIGURE 5, is a wheel-like structure having a central collar 29, an outer rim 31 and three spokes 32 connecting the collar 29 with the rim 31 and maintaining them in spaced relationship. Three teats 33 are fitted to the outside of the rim 31 and are composed of a friction-reducing material such as nylon. The locating member 28 is fitted to the dart 11 in such a way that it is prevented from moving axially relative to the shaft 12, this being achieved by sandwiching the collar 29 between one end of the shaft 12 and the washer 17. A pierceable closure member 19, made of rubber or a soft plastics material, is provided, which fits closely over the end 16 of the point portion 13.

A rubber piston 20 is disposed within the bore 10 in the shaft 12 and is arranged to be capable of sliding movement along the bore 10 while sealing in a fluid-tight manner against the wall of the bore 10. A valve 21, of the type used for motor-car tyres, is provided and is arranged so that it can be secured by screw threads close to the other end of the shaft 12 from the point portion 13. A cap member 22 is also provided and is arranged so that it can be secured by screw threads to the extreme end of the shaft 12. Flights 23 and a cock flight 24 are fixed to the outside of the shaft 12. The cap member 22 has its top, as it appears in the drawing, formed with rounded shoulders 26 and the arrangement is such that, when the cap member 22 is in position on the shaft 12, the axial plane containing the centres of both shoulders 26 is perpendicular to the plane of the cock flight 24. A driving plate 34 is provided, adapted to fit over, and exert a releasable grip upon, the end of the cap member 22. The exertion of a releasable grip is achieved by making the driving plate 34 in two portions 36 and 37 and connecting the two portions together by resilient means constituted by a resiliently flexible strip 38. Each of the portions 36 and 37 has a recess formed in it and, when they are held together in the position shown in FIGURE 4, the recesses together form a cavity 39, the outline of which is shown in broken lines in FIGURE 4, in which the end of the cap member 22 is a tight fit. The strip 38 is, as described, resiliently flexible and tends to urge the portions 36 and 37 apart, out of the position shown in FIGURE 4. Thus, when the portions 36 and 37 are held together in the position shown in FIG- URE 4 against the action of the flexible strip 38, they can exert a grip on the cap member 22 and, when they are not so held, they are urged apart by the strip 38 and the grip is released.

For use when charging the dart 11, a graduated rod 27 (FIGURE 2) is provided, having external screw threads at one end arranged to screw into complementary screw threads in the piston 20. The rod 27, of which only a part is shown in FIGURE 2, is long enough to reach to the bottom, as it appears in the drawing, of the bore 10.

In order to charge the dart 11, the graduated rod 27 is screwed into the piston 20 and is then used to push the piston 20 to the bottom of the bore 10 as it appears in the drawing. The end 16 of the point portion 13 is then dipped into a vessel containing the particular fluid drug or the like desired to be used. The rod 27 is then pulled in a direction away from the point portion 13, thus pulling the piston 20 with it and causing a quantity of fluid to enter the bore 10. By reference to the graduations on the rod 27 the pulling motion can be stopped when a predetermined quantity of fluid is contained in the bore 10. The end 16 is then withdrawn from the vessel and the closure member 19 is fitted over it. Next the rod 27 is unscrewed from the piston 20 and removed, after which the valve 21 is screwed into the shaft 12 and air is pumped under pressure through the valve 21 into the upper part of the bore 10 as it appears in the drawing. The piston 20 constitutes a barrier between the air and the fluid. The cap member 22 is then fitted.

A charged dart 11 is used to administer the fluid it contains to an animal in the following manner. The driving plate 34 is fitted to the cap member 22 and the portions 36 and 37 are held together so that the end of the cap member 22 is gripped in the cavity 39. The dart 11 is then loaded into the barrel of a gun. The outline of the wall of a bore 41 of a gun barrel is shown in chain-dotted lines in FIGURES 1 and 5 and, as can be seen, the dimensions of the locating member 28 are such that all the teats 33 engage the wall of the bore 41 when the dart 11 has been loaded. The driving plate 34 is a sliding fit in the bore 41 and in consequence the portions 36 and 37 are held together, when the dart 11 has been loaded, by the wall of the bore 41 and the grip is maintained on the cap member 22. The dimensions of the flights 23 and 24 are such that their edges abut against the wall of the bore 41 and are a sliding fit within it.

The dart 11 having been loaded into the gun, the gun can be aimed at the animal to which it is desired to administer the fluid drug. The propulsion means of the gun is actuated, causing a force to be exerted on the driving plate 34, which force urges the driving plate 34 and the dart 11 down the bore 41. During its passage down the bore 41, the dart 11 is maintained parallel with the bore 41 by the engagement of the teats 33, flights 23 and 24, and driving plate 34 with the wall of the bore 41. An easy passage of the dart 11 down the bore 41 is promoted by the friction-reducing properties of the teats 33. Furthermore the fact that the driving plate 34 engages the wall of the bore 41 and thus fills the whole of the cross-section of the bore 41 ensures that substantially the entire propulsive force produced by the gun is utilised in urging the dart 11 down the bore 41.

When the dart 11 has left the bore 41, the portions 36 and 37 of the driving plate 34 separate under the action of the strip 38 and hence the grip on the cap member 22 is released. Air resistance quickly arrests the flight of the driving plate 34 and it falls to the ground. The dart 11, however, continues its flight, its air resistance being materially reduced by the fact that the locating member 18 is made up of the collar 29 and the rim 31 connected by spokes 31 rather than of a solid piece of material.

If the aim is good, the dart 11 will hit the animal, making contact initially through the closure member 19. The momentum of the dart 11 then causes the sharpened edge of the end 16 to pierce the closure member 19 and to puncture the skin of the animal. The fluid is then forced into the animal's blood-stream by the pressurised air, which drives the piston 20 to the end of the bore 10. Drugs or the like can thus be administered to animals cheaply and, if a silent gun is employed, silently from ranges up to the gun's maximum. The shaft 12 of the dart is preferably made from aluminum alloy or a rigid plastics material; it is thus very light and is non-lethal even at short range.

The length of the point portion 13 can be varied according to the type of animal on which it is desired to be used. Thus for a rhinoceros or elephant, for example a length of about two inches is appropriate, while for animals with thinner skins, such as deer, a length of about one inch is appropriate. In the case of very thin-skinned animals such as roedeer, a rubber buffer may be provided around the point portion 13 close to its end 16.

The dart 11 described above has the advantage that it can easily be adapted for firing from a cross-bow. The locating member 28 and driving plate 34 are removed and the dart 11 is positioned in a cross-bow with the cock flight 24 extending vertically downwards from the shaft 12; hence the bow-string of the cross-bow passes over the rounded shoulders 26 of the cap member 22 and excessive wear of the bow string is prevented. Firing of the dart and consequent administration of the drug can then proceed as described above.

When the dart 11 is only required to be used in a gun, on the other hand, the flights 23 and 24 may be dispensed with, since the driving plate 34 provides sufficient location of the rear end of the dart. Alternatively, the driving plate 34 may be dispensed with provided that the flights 23 and 24 are retained, in which case it must be ensured that the flights 23 and 24 are a good sliding fit in the bore 41 to locate the rear end of the dart. Where the motive power for propelling the dart 11 is produced by an expanding gas or mixture of gases efficiency of propulsion will of course be reduced by removal of the driving plate 34. The driving plate 34 should therefore be retained where there is any possibility of long-range shooting being required.

The flights 23 and 24 are normally made of plastic fletchings; however, when the dart is to be fired from a gun having a choke-bore, feather fletchings are preferable to allow easy passage through the barrel.

What is claimed is:
1. A hypodermic dart comprising:
 (a) a shaft, said shaft having a bore extending longitudinally therethrough;
 (b) a sharpened point portion at one end of the shaft, said point portion having a passage extending therethrough into communication with the said bore;
 (c) a piston positioned in the said bore to define a fluid chamber between the said piston and the said point portion and slidable in the said bore in sealing contact therewith to drive fluid from the said fluid chamber through the said point portion;
 (d) barrier means to prevent egress of fluid from the said fluid chamber, the said barrier means being pierceable on impact of the dart with a target;
 (e) a reverse check valve removably fitted at the other end of the said shaft to permit entry of pressurised air to pressurise the portion of the said bore on the other side of the said piston from the said fluid chamber; and
 (f) coupling means mounted at the said other end of the said shaft to connect the said bore through the said reverse check valve to a source of compressed air.
2. A hypodermic dart as claimed in claim 1 wherein the said barrier means comprises a pierceable member removably fitted over the said point portion to close the said passage.

3. A hypodermic dart as claimed in claim 1 and further including:
(a) biasing means biasing the said valve towards the closed position; and
(b) an actuating member operatively connected to the said valve and usable to open the said valve.

4. A hypodermic dart as claimed in claim 1 and further including a cap member removably fitted on the said other end of the said shaft to be acted upon by the string of a bow.

5. A hypodermic dart as claimed in claim 1 and further including a resilient buffer fitted around the said point portion.

References Cited

UNITED STATES PATENTS

| | | | |
|---|---|---|---|
| 2,348,337 | 5/1944 | Francis | 102—92 |
| 2,995,373 | 8/1961 | Cox | 273—106.5 |
| 3,006,649 | 10/1961 | Gesick et al. | 273—106.5 |
| 3,137,195 | 6/1964 | Rosenberg et al. | 102—93 X |
| 3,180,265 | 4/1965 | Rybak | 102—42 |
| 3,209,696 | 10/1965 | Palmer et al. | 102—92 |
| 3,207,157 | 9/1965 | Murdock | 128—218 |

ROBERT F. STAHL, *Primary Examiner.*